UNITED STATES PATENT OFFICE.

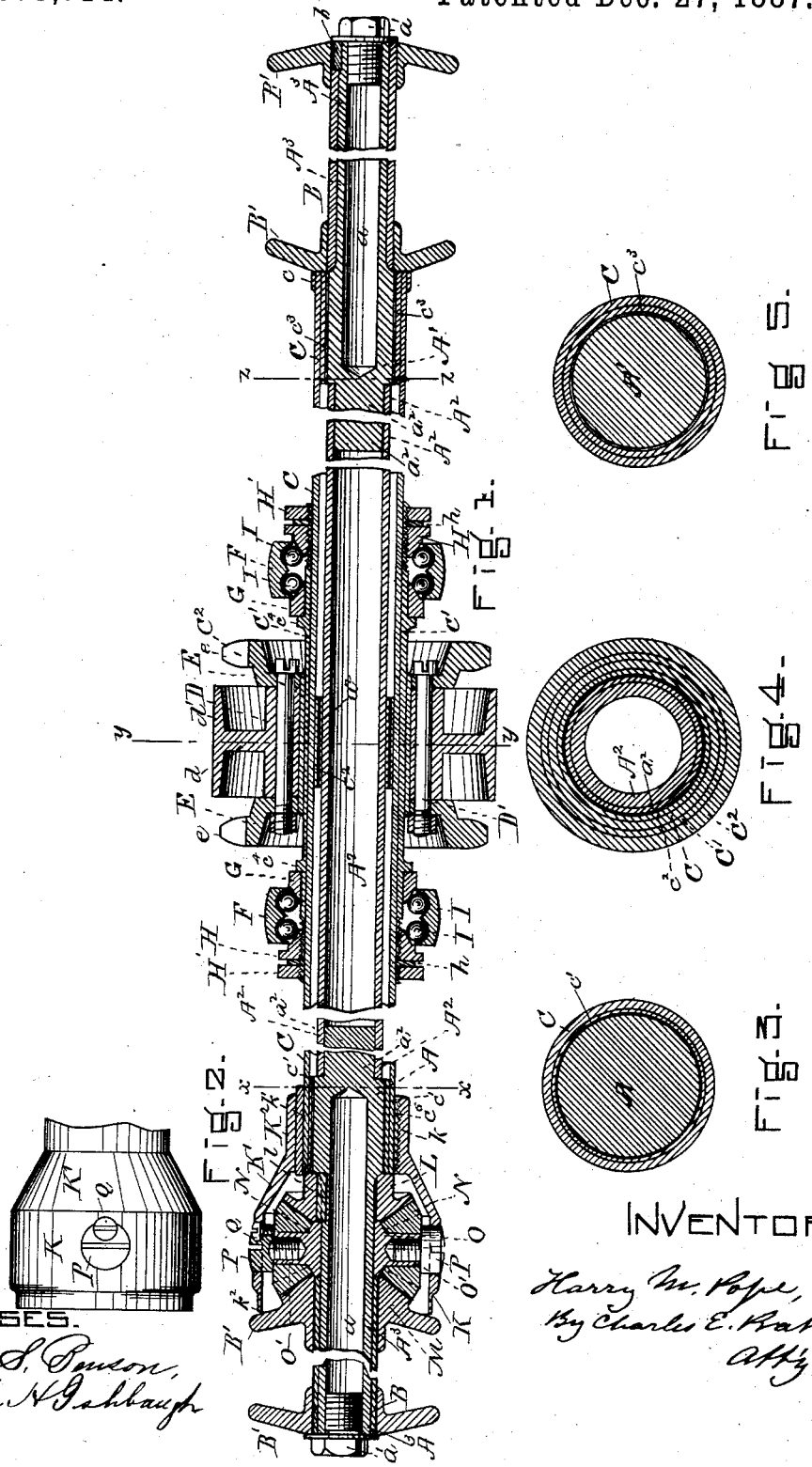

HARRY M. POPE, OF HARTFORD, CONNECTICUT, ASSIGNOR TO THE POPE MANUFACTURING COMPANY, OF PORTLAND, MAINE.

VELOCIPEDE.

SPECIFICATION forming part of Letters Patent No. 375,714, dated December 27, 1887.

Application filed February 28, 1887. Serial No. 229,173. (No model.)

*To all whom it may concern:*

Be it known that I, HARRY M. POPE, of the city and county of Hartford, in the State of Connecticut, have invented certain new and useful Improvements in Velocipedes, of which the following is a specification.

I have shown and will describe my present improvements as embodied in one form in the axle and connected mechanisms of a tricycle, and they relate more particularly to the shaft or axle connecting the two driving-wheels and a balance-gear, and connecting and supporting devices by which the same are combined with the frame and driving mechanism of a velocipede; and the nature and objects of my improvements will be apparent from the following description, taken in connection with the drawings, in which—

Figure 1 shows in vertical longitudinal section on the axial line an axle, outer tubing, driving-sprockets, bearings, hubs, and balance-gear of a tricycle. Fig. 2 shows in elevation the bell-case of the balance-gear; and Figs. 3, 4, and 5 show cross-sections on the lines $x\,x$, $y\,y$, and $z\,z$, respectively, enlarged.

A A' are axle-forgings, hollowed out, as at $a\,a$, for lightness, and having bearings for the driving-wheels and tenons or stubs $a^2\,a^2$, to receive the connecting-tube $A^2$, which constitutes, with the end pieces, A A', an inner axle or shaft.

B B B' B' B B' are the hubs and hub-flanges of the driving-wheels, which are secured upon the ends of the axle when in place by means of the short linchbolts $a'\,a'$. One of these wheels, on the axle end A', is fixed, by means of the key $b$, fast and rotating with the axle. The other, on the axle end A, is free to revolve on the shaft.

C is an outer sleeve or tubular shaft inclosing the inner shaft, and, as I prefer to make it, extending substantially from end to end between the wheels, or, rather, between the fast wheel and the balance-gear case, which is adjacent to the loose wheel. Within this outer sleeve I form three bearings, preferably by inserting and securing, by sweating or otherwise, three tubular pieces, $c'\,c^2\,c^3$, and I form true cylindrical bearings in these pieces about the same axial line, but of slightly-differing diameters, that of $c'$ being the largest, that of $c^2$ being slightly smaller, and that of $c^3$ being slightly smaller still, this difference in diameter being allowed for the purpose of more accurately centering and truing the bearings in construction, and also for the purpose of permitting an easy and practicable assembling and disassembling of the parts, as will be more fully referred to herein. I also by preference sweat or otherwise secure a small tubular expansion, $a^3$, upon the middle part of the shaft $A^2$, and form the middle bearing thereon. I construct this middle bearing between the outer sleeve and the inner axle or shaft for the purpose of steadying and strengthening the structure, and particularly to meet the strain at this part of the sprocket wheel or wheels and driving mechanism. Upon this outer sleeve I also secure, by sweating or otherwise, a small strengthening-ring, as $c$, at the end next the fast wheel, and the strengthening-tube and enlarging-tube C' along the middle portion to receive the sprocket-wheel, the bearings, and the threads for the adjusting-cones of the bearings. I also leave upon or add to the strengthening-tube C' a raised middle portion, $C^2$, whereto I secure, by sweating, brazing, or in any suitable manner, a nave, D, which has a flange, $d$, and drum $d'$, on which a band-brake may be placed and operated. To the nave D, I secure, by bolts D', or in any suitable manner, a sprocket wheel or crown, E, having the sprocket-teeth $e$, and for the purposes of a tandem tricycle I secure two of these sprocket-crowns E E—one on either side the nave D, as shown—for the purpose of operation by two driving-chains connected with the sprockets in any usual manner, by chains or otherwise.

F F are bearing-cases to be held in brackets or projections from the main frame of the tricycle, and containing by preference cylindrical rows of balls I I, which have bearings in the cases F F and on the fixed cones G G, placed upon and against shoulders on the strengthening-tube C', and upon the adjusting-cones H H, threaded upon the strengthening-tube C', and secured in position by the set-nuts H' H'.

K is a barrel, K' the shoulder, and $K^2$ the cannon or neck, of a bell-shaped balance-gear case, threaded, as at $k$, upon the outer sleeve, C, or an enlargement, as $c^6$, thereof, and further secured by a key, $k'$; and $k^2$ is simply a lip or dust-guard extension of this bell-shaped case to meet the flange B' of the loose wheel and prevent access of dust.

L is a bevel-wheel secured to the end piece, A, of the shaft by a key, $l$.

M is a corresponding bevel wheel secured to or formed upon the hub-flange B' of the loose wheel.

N N are intermediate bevel-wheels meshing with L and M, and having free bearings on the trunnions or projections O' O' of the trunnion-piece O. This trunnion-piece O has a free bearing on the shaft A, and its nave offers end bearings to the loose wheel or its bevel-wheel M and to the bevel-wheel L, which latter has a bearing against a shoulder on the end piece, A, of the shaft to prevent lateral movement.

P P are trunnion-screws having slotted heads for screw-driver, as I prefer to make them, entering the sides of the barrel K, and threaded portions screwing into the trunnions O' O', against which the heads of these trunnion-screws bring up. These trunnion-screws may be further secured in place by small dog-screws Q.

The inner shaft may be made solid and continuous from end to end, instead of tubular, as I have shown and described it. The outer sleeve may be shorter, the strengthening-sleeve C' may be omitted or formed upon or integral with the outer sleeve, C, the nave D may be attached in a different position—as, for instance, at either end of the outer sleeve—and divers other modifications may be made in the form and arrangement of the devices herein shown without departing from the substance of my invention, and still retain some of the advantages of my improvements; hence I do not intend to limit myself to the precise forms and arrangements herein shown and described.

It will be seen and understood now that the operation of this contrivance is as follows: The parts all being assembled and in position in the manner shown in the drawings and embodied in a tricycle with wheels, frame, and suitable connections and driving mechanism of any approved form, when power is applied and the sprocket E is caused to revolve, it will impart a revolving motion to the outer sleeve, C, and the balance-gear case and the trunnion-piece O and the intermediate gears, N N, will be carried round thereby. These intermediate gears will distribute the motion on the one side through the bevel-wheel M to the loose wheel, and on the other side through the bevel-wheel L to the inner shaft and the fast wheel, and the mean of the motions of these two bevel-wheels M and L will always be equal to the motion of the sprocket E. In case of any deviation of the course from a straight line—as in going around curves—the outer sleeve will be allowed to travel faster—indeed, compelled to travel faster—by the operation of this device. It is also obvious that at any difference in speed of rotation of the two driven wheels, or, what is the same thing, in that of the two bevel-wheels M and L, then in that case there will be a difference of revolution between the outer sleeve, C, and the shaft A A' A², and this difference of revolution will be accommodated by the bearings at $c'$ $c^2$ $c^3$. The bearing $c^2$, I have introduced midway in the axle or beneath the action of the sprocket-wheel, or between the main bearings F F, for steadying and strengthening purposes, as will be seen, and the strengthening-sleeve is introduced both for steadying and strengthening, these two features each, and both together, tending to prevent that springing of the axle, or of the mechanism connected with it, which has been so objectionable in tricycles, whether tandems or singles, having central driving-gear or main bearings some distance from the driving-wheels toward the middle of the machine. It is also obvious that by simply removing the linchbolt $a'$ the loose driving-wheel may be removed, and that then by removing the set-screws Q and the trunnion-screws P the trunnion-piece O and bevel-wheels N N and L may be readily removed, and that by removing the other linchbolt, $a$, the shaft A A' A² may be entirely withdrawn from the outer sleeve and the rest of the mechanism on account of the differences in diameter of the bearings between the outer sleeve and the shaft at $c'$ $c^2$ $c^3$, and that the parts may be as readily assembled again after they have been cleaned or repaired and may be properly adjusted together.

I claim as new and of my invention—

1. In a velocipede, and combined with an outer sleeve, balance-gear device, sprocket-wheel, and bearings, an axle constructed, essentially as set forth, to have a series of separate bearings of different sizes in the sleeve.

2. In a velocipede, and combined with an outer sleeve, a balance-gear device, a sprocket-wheel, and bearings, an axle constructed to have a series of separate bearings of different sizes in the sleeve and to carry one fixed and one free traction-wheel.

3. In a velocipede, and combined with a sprocket-wheel, main bearings, an outer sleeve, and a connecting device between the outer sleeve and the inner shaft, a shaft or axle constructed, essentially as set forth, to have a series of separate bearings of different sizes in the sleeve.

4. In a velocipede, and combined with a sprocket-wheel, main bearings, an outer sleeve, and a balance-gear device, an axle constructed, essentially as set forth, to have a series of bearings of different sizes in the sleeve and to have a middle tubular portion and forged ends.

5. In a velocipede, and combined with a sprocket-wheel, main bearings, an outer sleeve, and a balance-gear device, an axle constructed, essentially as set forth, to have a series of bearings of different sizes in the sleeve and tubular and strengthened at the ends and at the middle portion.

6. In a velocipede, and combined with a continuous inner shaft, as $A^2$, and a balance-gear device near one end and between the main-frame bearing and the wheel, a tubular outer sleeve affording supports for the central sprocket-wheel and the main-frame bearing on each side of the sprocket, and constructed with three bearings on the inner shaft, one at or near the middle and one at or near each end of the sleeve.

7. In a velocipede, and combined with an inner shaft having a series of bearings of differing diameters and a balance-gear device, a tubular outer sleeve constructed with three bearings of differing diameters and strengthened at the bearings.

8. In a balance-gear device, a removable trunnion-piece, as O, having a free bearing on the shaft, and having trunnions affording a bearing for intermediate wheels, and trunnion-screws, as P P, and dog-screws Q Q, constructed and combined essentially as set forth.

HARRY M. POPE.

Witnesses:
F. E. BELDEN,
G. M. BARNARD.